United States Patent
Berry

(10) Patent No.: US 9,846,002 B2
(45) Date of Patent: Dec. 19, 2017

(54) METHOD AND APPARATUS TO DETERMINE AN EFFECTIVE TEMPERATURE OF COOLANT FLUID FOR A HEAT GENERATING DEVICE

(71) Applicant: GM GLOBAL TECHNOLOGY OPERATIONS LLC, Detroit, MI (US)

(72) Inventor: Daniel J. Berry, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 255 days.

(21) Appl. No.: 14/574,469

(22) Filed: Dec. 18, 2014

(65) Prior Publication Data
US 2016/0178548 A1   Jun. 23, 2016

(51) Int. Cl.
| | |
|---|---|
| G05D 23/00 | (2006.01) |
| F28F 27/00 | (2006.01) |
| G01K 13/02 | (2006.01) |
| F28D 15/00 | (2006.01) |
| H02K 9/19 | (2006.01) |
| H02K 9/24 | (2006.01) |
| H02K 11/25 | (2016.01) |

(52) U.S. Cl.
CPC ............ *F28F 27/00* (2013.01); *F28D 15/00* (2013.01); *G01K 13/02* (2013.01); *H02K 9/19* (2013.01); *H02K 9/24* (2013.01); *G01K 2013/026* (2013.01); *H02K 11/25* (2016.01)

(58) Field of Classification Search
CPC ............ F28F 27/00; F28D 15/00; H02K 9/24; H02K 9/19; H02K 11/25; G02K 13/02
USPC .......................... 165/287, 288, 279, 280, 293
See application file for complete search history.

(56) References Cited

U.S. PATENT DOCUMENTS

| | | | | |
|---|---|---|---|---|
| 3,662,819 A | * | 5/1972 | Hartline, Jr. ........ | G05D 23/1919 165/259 |
| 8,133,156 B2 | * | 3/2012 | Barney ................... | F01P 7/06 192/3.29 |
| 2008/0032860 A1 | * | 2/2008 | Holtz .................... | F16H 61/143 477/62 |

(Continued)

FOREIGN PATENT DOCUMENTS

| | | |
|---|---|---|
| CN | 101268286 A | 9/2008 |
| CN | 104734424 A | 6/2015 |

(Continued)

*Primary Examiner* — Claire Rojohn, III
(74) *Attorney, Agent, or Firm* — Quinn IP Law

(57) ABSTRACT

A method for dynamically monitoring temperature of a fluid at a heat generating device includes monitoring, using a temperature sensor, temperature of the fluid held in a fluidic sump. A first fluidic flow rate and a second fluidic flow rate are determined. A third fluidic flow rate and a temperature drop of the fluid across the heat exchanger in the active coolant circuit are determined based upon the temperature of the fluid and the third fluidic flow rate through the active coolant circuit. A fluid temperature supplied to the electric machine through the active coolant circuit is determined based upon the third fluidic flow rate and the temperature drop of the fluid across the heat exchanger. An effective temperature of the fluid is determined based upon the temperature of the fluid in the sump and the temperature of the fluid supplied to the electric machine through the active coolant circuit.

4 Claims, 2 Drawing Sheets

(56) References Cited

U.S. PATENT DOCUMENTS

| | | | |
|---|---|---|---|
| 2009/0179509 A1* | 7/2009 | Gerundt | F16H 57/0413 |
| | | | 310/54 |
| 2012/0103591 A1* | 5/2012 | Tozer | F25D 16/00 |
| | | | 165/281 |
| 2013/0068442 A1* | 3/2013 | Di Stefano | F25B 49/02 |
| | | | 165/253 |
| 2016/0096413 A1* | 4/2016 | Han | B60K 11/02 |
| | | | 165/287 |
| 2016/0123634 A1* | 5/2016 | Smith | F25B 31/004 |
| | | | 165/287 |
| 2016/0178296 A1* | 6/2016 | Kowarschik | F25D 17/02 |
| | | | 165/287 |

FOREIGN PATENT DOCUMENTS

| | | |
|---|---|---|
| DE | 10235433 B4 | 3/2012 |
| EP | 2503123 A1 | 9/2012 |
| JP | 2012237485 A | 12/2012 |

* cited by examiner

US 9,846,002 B2

METHOD AND APPARATUS TO DETERMINE AN EFFECTIVE TEMPERATURE OF COOLANT FLUID FOR A HEAT GENERATING DEVICE

TECHNICAL FIELD

This disclosure relates to cooling systems for heat generating devices including electric machines, and temperatures associated therewith.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Devices generating heat during operation may be equipped with cooling systems to remove heat to prevent temperature-related damage. One form of heat-generating devices includes electric motor/generators (machines), including those employed in hybrid and electric vehicle applications. Heat generating devices may provide temperature feedback to a control system to control operation and to prevent temperature-related damage to motor windings caused by operating outside of a preferred temperature range related to service life. Such control systems may include control routines to derate motor torque output when temperature exceeds a threshold temperature. However, derating motor torque output is undesirable from a perspective of expected performance of the heat generating device.

SUMMARY

A cooling system for a heat generating device is described and includes a fluidic pump fluidly connected to a passive coolant circuit and an active coolant circuit each in fluidic communication with the heat generating device. The active coolant circuit includes a heat exchanger, a passive bypass control valve and a bypass circuit. A method for dynamically monitoring temperature of the fluid at the heat generating device includes monitoring, using a temperature sensor, temperature of the fluid held in a fluidic sump supplying the fluid to the fluidic pump. A first fluidic flow rate through the passive coolant circuit and a second fluidic flow rate through the active coolant circuit are determined. A third fluidic flow rate and a temperature drop of the fluid across the heat exchanger in the active coolant circuit are determined based upon the temperature of the fluid and the third fluidic flow rate through the active coolant circuit. A fluid temperature supplied to the electric machine through the active coolant circuit is determined based upon the third fluidic flow rate and the temperature drop of the fluid across the heat exchanger. An effective temperature of the fluid is determined based upon the temperature of the fluid in the sump and the temperature of the fluid supplied to the electric machine through the active coolant circuit.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
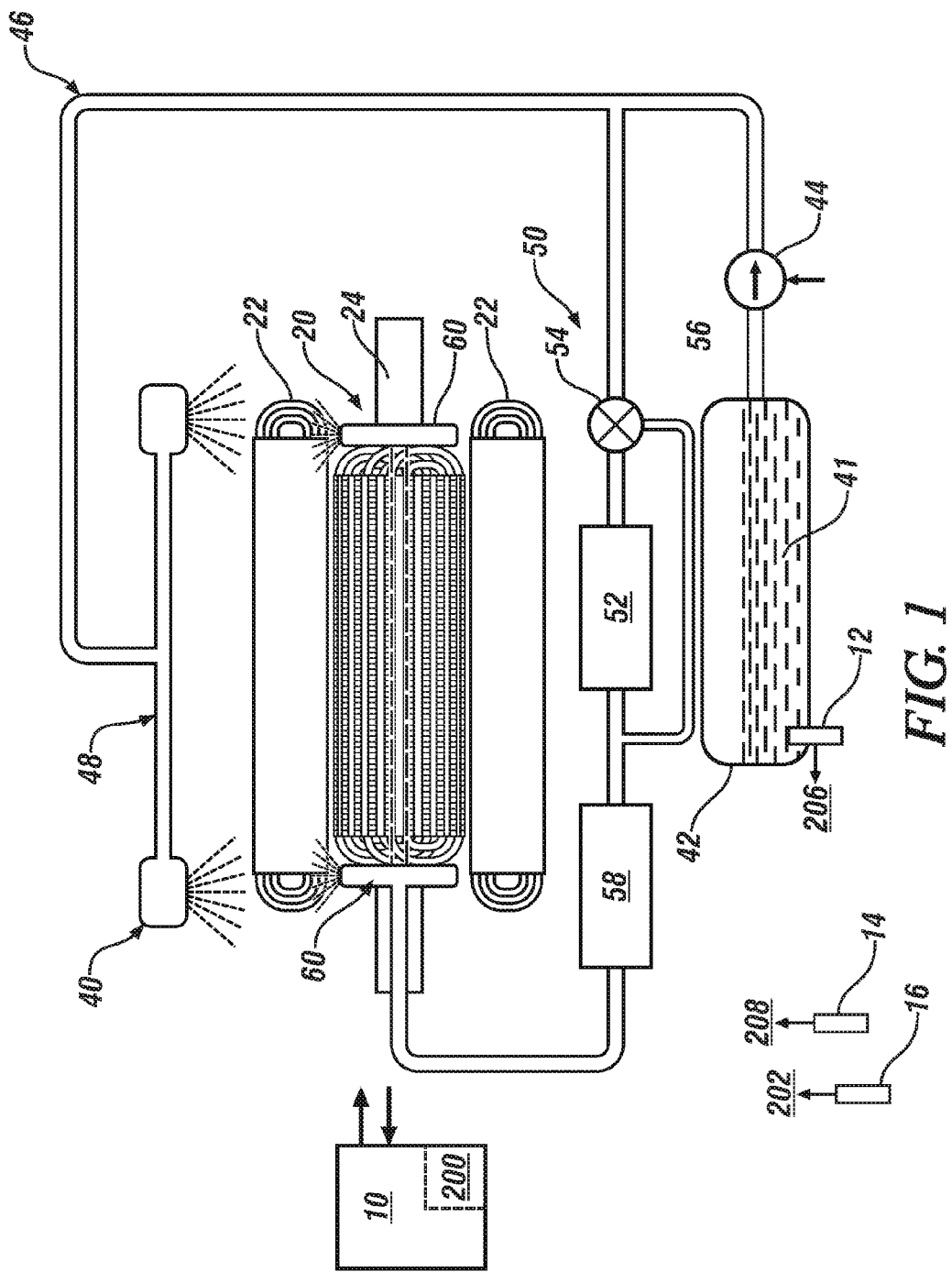
FIG. 1 schematically illustrates an electrically-powered motor/generator (electric machine), an associated cooling/lubricating system including first and second coolant circuits, and a controller, in accordance with the disclosure.

Referring now to the drawings, wherein the depictions are for the purpose of illustrating certain exemplary embodiments only and not for the purpose of limiting the same, FIG. 1 schematically illustrates elements of an electrically-powered motor/generator (electric machine) 20, an associated cooling/lubricating system 40 and controller 10 executing a control routine 200. As described herein, the electric machine 20 is employed to generate tractive effort on a vehicle, although the disclosure is not so limited. The electric machine 20 is one example of a heat generating device. Other heat generating devices employing an embodiment of the associated cooling/lubricating system 40 and controller 10 executing control routine 200 may be considered within the scope of this disclosure.

The electric machine 20 includes a stator 22 and a coaxial rotor 24, and may be any suitable electric machine, such as an asynchronous motor or a synchronous motor. In one embodiment, the electric machine 20 is a traction motor and the rotor 24 couples to a vehicle driveline to generate tractive torque for vehicle propulsion. Other motor control elements such as inverters, batteries and related circuits are not shown.

The cooling/lubricating system 40 includes a fluidic pumping element 44, a first, passive coolant circuit 46 and a second, active coolant circuit 50 that supplies fluid 41 for cooling and lubricating the electric machine 20, with the fluid 41 being drawn from a sump 42. The fluid 41 is transmission oil in one embodiment having known lubricity and specific heat properties. The fluidic pumping element (pump) 44 is an electrically-powered device having known speed and flow rate properties. Pump 44 draws fluid 41 from the sump 42 and supplies pressurized fluid 41 to the first and second coolant circuits 46, 48. Pump 44 is preferably controlled using a pulsewidth-modulated control signal sent from the controller 10, or using another suitable control signal. Alternatively, pump 44 can be a mechanically-driven pump that rotatably couples to an engine crankshaft. A temperature sensor 12 monitors temperature of the fluid 41 in the sump 42 or at another suitable location in the cooling/lubricating system 40. The temperature sensor 12 signally connects to the controller 10.

The first, passive coolant circuit 46 includes fluidic conduits and other elements capable of supplying pressurized fluid 41 to a stator manifold 48. The stator manifold 48 is positioned adjacent to the stator 22 of the electric machine 20, and supplies a flow of the fluid 41 to end turns of the stator 22 to effect cooling thereof. The first coolant circuit 46 is passive in that there is no device for adding or removing heat from the fluid 41 flowing therethrough. It is appreciated that some heat transfer may occur through the fluidic conduits.

The second, active coolant circuit 50 includes fluid conduits and other elements capable of supplying pressurized fluid 41 to a rotor manifold 60. The second coolant circuit 50 includes a heat exchanger 52 and a bypass circuit 56 both leading to a gear box 58, wherein flow of the fluid 41 through the heat exchanger 52 and the bypass circuit 56 is controlled by a bypass control valve 54. In one embodiment, the heat exchanger 52 is an air-cooled heat exchanger that relies upon convective and/or radiant heat transfer to remove heat from the fluid 41. Alternatively, the heat exchanger 52 can be any suitable device that employs air or another second fluid to remove heat from the fluid 41. When the electric machine 20 is implemented on a vehicle, the heat exchanger 52 can be deployed at a suitable location to permit flow of ambient air thereacross, and may also include a controllable fan and/or controllable vents to control the magnitude of ambient airflow. The second coolant circuit 50 is active in that it includes a device, i.e., the heat exchanger 52 for adding or removing heat from the fluid 41 flowing therethrough. The bypass control valve 54 controls magnitudes of fluid flow rates through the heat exchanger 52 and the bypass circuit 56 in response to temperature of the fluid 41 impinging upon the bypass control valve 54. In one embodiment, the bypass control valve 54 is passively controlled using a wax pellet or other suitable temperature-controlled element that melts when the fluid 41 reaches a preset temperature, thus permitting fluidic flow through either or both the heat exchanger 52 and the bypass circuit 56. Alternatively, the bypass control valve 54 may be an active device that is operatively connected to the controller 10 and controls magnitudes of fluid flow rates through the heat exchanger 52 and the bypass circuit 56 in response to temperature of the fluid 41 as measured by the temperature sensor 12. As such, fluid 41 for cooling the electric machine 20 originates from the sump 42 and is supplied from the first and second coolant circuits 46, 50.

The controller 10 includes an executable control routine 200 and signally connects to the sump temperature sensor 12, an ambient air temperature sensor 14 and a vehicle speed sensor 16 when the control routine 200 is employed on a vehicle. The controller 10 may be a unitary device, or a plurality of discrete devices that are configured to communicate. The controller 10 and related terms including control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers and between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. The term 'model' refers to a processor-based or processor-executable code and associated calibration that simulates a physical existence of a device or a physical process.

Figure 2:
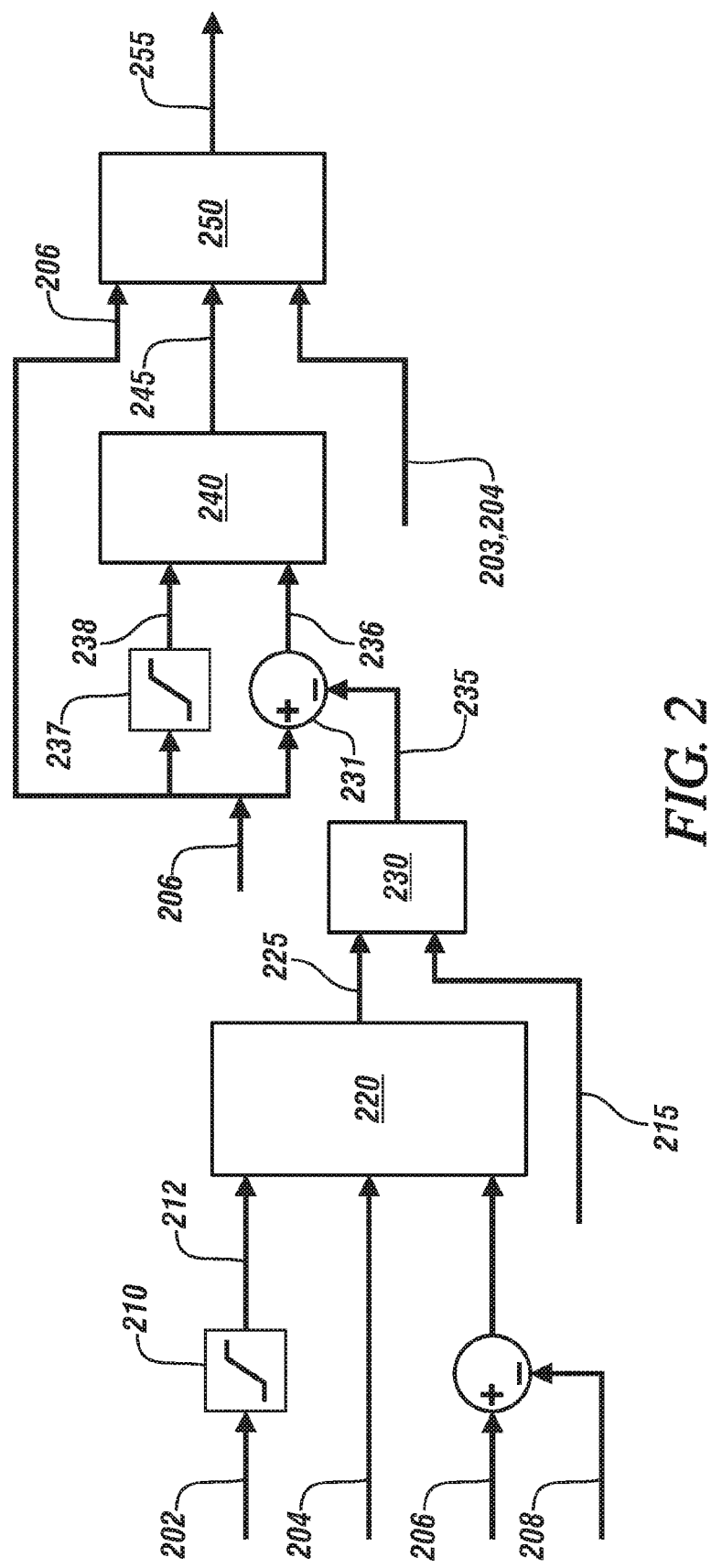
FIG. 2 schematically shows a control routine for determining an effective temperature of the fluid for an embodiment of the cooling/lubricating system and associated electric machine described with reference to FIG. 1, in accordance with the disclosure.

FIG. 2 schematically shows the control routine 200 for determining an effective temperature of the fluid 41 for an embodiment of the cooling/lubricating system 40 for the associated electric machine 20, wherein the cooling/lubrication system 40 includes first and second coolant circuits 46, 50 described with reference to FIG. 1. As described herein, the electric machine 20 and associated cooling/lubricating system 40 are employed on a vehicle in one embodiment. Alternatively, the control routine 200 may be employed with any embodiment of a cooling system that includes multiple coolant circuits wherein one of the coolant circuits is a passive coolant circuit and another of the coolant circuits is an active coolant circuit that supplies fluid 41 for cooling a heat generating device. As previously described, fluid 41 is not routed through the heat exchanger 52 until the temperature of the fluid 41 is sufficiently high to minimize spin losses in the gear box 58 of the transmission. The temperature at which fluid 41 begins to be routed through the heat exchanger 52 is passively controlled using a wax pellet that melts once the fluid 41 reaches a certain temperature in one embodiment. Thus the system has no direct feedback related to magnitude of fluidic flow through the heat exchanger 52. The control routine 200 is a scheduled routine that executes periodically during ongoing operation.

The control routine 200 executes by collecting information related to fluid flow rates in portions of the second coolant circuit 50, including a first flow rate 203 through the first coolant circuit 46 and a second flow rate 204 through the second coolant circuit 50 including the heat exchanger 52, the bypass circuit 56 and the bypass control valve 54. The fluid flow rates may be determined elsewhere, such as through other controllers and sensing systems. The first and second flow rates 203, 204 are determined in relation to pump speed, fluid temperature, line pressures, circuit layouts, and other factors, and are system-specific. As such, they can be pre-calibrated terms that are stored in a memory device and retrieved when needed.

Parameters associated with operating the control routine 200 include vehicle speed 202, the second flow rate 204 of the fluid 41 through the heat exchanger 52 and its specific heat, temperature of the fluid 41 in the sump (sump temperature) 206 and ambient temperature 208. The vehicle speed 202 may be replaced with another suitable parameter that can be employed to determine an air flow rate across the heat exchanger. The vehicle speed 202 serves as a proxy for air velocity across the heat exchanger 52, which affects heat transfer. Other factors affecting air velocity across the heat exchanger include a radiator fan speed and shutter state (open, partially open, closed), and may be accounted for using calibrations, correction factors and/or other known control techniques.

States of the parameters of vehicle speed 202, the second flow rate 204 of the fluid 41 through the heat exchanger 52 and its specific heat, sump temperature 206 and ambient temperature 208 are employed to estimate a temperature drop of the fluid 41 across the heat exchanger 52 when the bypass control valve 54 is fully opened and 100% of the second flow rate 204 is flowing through the heat exchanger 52 (220). The governing equations used to estimate the temperature drop are as follows:

$$\dot{Q}_{Cooler} = \dot{m}c_p \Delta T$$

$$\dot{Q}_{Cooler} = hA(T_{Oil} - T_{Ambient}) \quad [1]$$

wherein:
$\dot{Q}_{Cooler}$=Amount of Heat Transfer From Fluid to Ambient Air [watts];
$\dot{m}$=Mass Flowrate 204 of Fluid Through Heat Exchanger [kg/sec];
$c_p$=Specific Heat of Fluid [J/kg*K];
$\Delta T$=Temperature Drop of Fluid Across Heat Exchanger [C] 225;
hA=Inverse of Thermal Resistance of Heat Exchanger [Watt/K] 212;
$T_{Oil}$=Fluid Temperature At Inlet of Heat Exchanger [C], i.e., the sump temperature 206; and
$T_{Ambient}$=Ambient Air Temperature [C] 208.

The temperature drop $\Delta T$ 225 of the fluid 41 across the heat exchanger 52 can be shown to be as follows, assuming that all heat removed from the fluid 41 is dissipated to ambient air, thereby eliminating $\dot{Q}_{Cooler}$ from the equations:

$$\Delta T = \frac{hA}{\dot{m}c_p}(T_{Oil} - T_{Ambient}) \quad [2]$$

The hA term 212 represents an inverse of the thermal resistance of the heat exchanger 52 and is a property of the heat exchanger design property 210 in relation to the vehicle speed 202 and other elements. Details related to determining a value for the thermal resistance hA 212 of the heat exchanger 52 are known to those skilled in the art and are not discussed in detail herein.

The temperature drop $\Delta T$ 225 may be compared with a maximum allowable temperature drop 215 (230). The value of $\Delta T$ may be clipped to a maximum allowable temperature drop $\Delta T$max 235 to avoid unrealistic temperature predictions in the case of low fluidic flow rates under operating conditions when transient effects may be more significant. Such comparison of the temperature drop $\Delta T$ 225 and the maximum allowable temperature drop 215 may be omitted in some embodiments.

The sump temperature 206 is reduced by the temperature drop $\Delta T$ 225 (231), limited by the maximum allowable temperature drop $\Delta T$max 235 in one embodiment to determine a heat exchanger outlet temperature 236. The sump temperature 206 is also employed to determine the state of the bypass control valve 54. When the bypass control valve 54 is a passive device, e.g., as described with reference to FIG. 1, a characteristic flow rate calibration curve can be developed and implemented as a one-dimensional (1-D) lookup table 237 that provides a magnitude of valve opening (e.g., 0% to 100% of fully open) 238 in relation to the temperature of the fluid 41, i.e., the sump temperature 206.

The sump temperature 206 can be employed to determine the magnitude of the valve opening 238, and the magnitude of valve opening 238 can be readily translated to a third flow rate when pressure and the second flow rate 204 are known. In one embodiment, when the fluidic temperature is less than a minimum threshold temperature, the bypass control valve 54 is closed and all fluid 41 associated with the second flow rate 204 is routed to the gear box 58 and bypasses the heat exchanger 52. As the fluidic temperature indicated by sump temperature 206 increases, the bypass control valve 54 opens partially and routes a portion of the second flow rate 204 through the heat exchanger 52. This is referred to herein as the third flow rate. A remaining portion of the second flow rate 204 bypasses the heat exchanger 52 to the gear box 58. When the sump temperature 206 achieves an upper threshold temperature, the bypass control valve 54 is fully opened (100%), all the fluid 41 is routed through the heat exchanger 52 to the gear box 58, and thus the third flow rate equals the second flow rate 204. The minimum threshold temperature and upper threshold temperature associated with the bypass control valve 54 are calibratable temperatures in one embodiment.

The magnitude of the valve opening 238 and the heat exchanger outlet temperature 236 are combined using weighted averaging or other suitable techniques to estimate a fluid temperature 245 for the pressurized fluid 41 supplied to the rotor manifold 60 through the second coolant circuit 50 (240). In this manner, the fluid temperature drop across the heat exchanger 52 is subtracted from the sump temperature 206 and weighted for the opening state of the bypass control valve 54 via a 1-D lookup table such that when bypass control valve 54 is closed the fluid temperature 245 is estimated to be the same as the sump temperature 206 and when the bypass control valve 54 is fully opened the fluid temperature 245 is estimated to be the same as the heat exchanger outlet temperature 236. During any transition state when the bypass control valve 54 is partially opened, the control routine 200 determines a flow rate-weighted average between the heat exchanger outlet temperature 236 and the sump temperature 206 based upon the third flow rate.

The sump temperature 206, the fluid temperature 245, the first flow rate 203 through the first coolant circuit 46 and the second flow rate 204 through the second coolant circuit 50 are aggregated to determine a single effective fluid temperature 255 for cooling the electric machine (250) as follows according to the below equation:

$$\text{Effective Fluid Temperature} = \frac{\dot{V}_{Stator}}{\dot{V}_{Total}}T_{Sump} + \frac{\dot{V}_{Rotor}}{\dot{V}_{Total}}T_{Cooler} \quad [3]$$

wherein:
$\dot{V}_{Stator}$=Stator Flowrate
$\dot{V}_{Rotor}$=Rotor Flowrate
$\dot{V}_{Total}=\dot{V}_{Rotor}+\dot{V}_{Stator}$
$T_{Sump}$=Sump Temperature
$T_{Cooler}$=Oil Cooler Temperature Additionally, a 1-D calibration table with the sump temperature 206 as the input can be developed to provide scaling factors related to the effectiveness of the stator and rotor cooling in relation to the coolant temperature. Development and implementation of scaling factors related to the effectiveness of the stator and rotor cooling in relation to the coolant temperature are system-specific and can be developed by a person having ordinary skill in the art.

The single effective fluid temperature 255 can be employed in a real time temperature estimation algorithm to determine a temperature of the electric machine, thus enabling motor control that maximizes torque output from the electric machine while preventing temperature-related damage to motor windings caused by operating outside of temperature limits affecting service life.

The control routine 200 is described in context of an embodiment of a cooling system that includes a single first passive coolant circuit 46 and a single active second coolant circuit 50. A person having ordinary skill in the art can readily employ the concepts described herein to cooling systems having either multiple first passive coolant circuits 46 and/or multiple active second coolant circuits 50 employing a modification of EQ. 3 to calculate a single effective fluid temperature.

The control routine 200 preferably includes simplifications that facilitate integration into a vehicle control system, including minimizing transient effects caused by system dynamics in the system. Testing has shown that the temperature effect of transients in the system are relatively small, in the order of magnitude of a few degrees, and within an expected accuracy of the algorithm. Furthermore, thermal capacities of the electric machine and the fluid in the sump that are expressed as thermal time constants serve to mitigate transient effects. Furthermore, temperature of the air across the heat exchanger may not reflect ambient air temperature. In one embodiment, the heat exchanger 52 may be part of a group of heat exchangers and will be exposed to air which is at a temperature higher than ambient temperature. Care should be taken if, for example, the heat exchanger 52 is located behind an engine radiator as the air temperature in this case may be significantly hotter than ambient air, and must be accounted for in any implementation. Because the control routine 200 relies on many inputs, it includes appropriate default action if any of the input signals indicate occurrence of a fault or are not available due to a communications fault. By way of example, if any of the input signals that contribute to estimating the single effective motor cooling fluid temperature 255 are unavailable, the sump temperature can be used directly as the motor cooling fluid temperature.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for dynamically monitoring temperature of fluid employed in a cooling system for an electric machine, the cooling system including a fluidic pump fluidly connected to a passive coolant circuit and an active coolant circuit each in fluidic communication with the electric machine, wherein the active coolant circuit includes an air-cooled heat exchanger and a passive bypass control valve and a bypass circuit, the method comprising:
   monitoring, using a temperature sensor, temperature of the fluid held in a fluidic sump supplying the fluid to the fluidic pump;
   determining a first fluidic flow rate through the passive coolant circuit and a second fluidic flow rate through the active coolant circuit;
   determining a third fluidic flow rate and a temperature drop of the fluid across the heat exchanger in the active coolant circuit based upon the temperature of the fluid and the third fluidic flow rate through the active coolant circuit, including determining a magnitude of opening of the passive bypass control valve based upon the temperature of the fluid, and determining the third fluidic flow rate across the heat exchanger based upon the magnitude of opening of the passive bypass control valve,
      wherein the third fluidic flow rate is equal to the second fluidic flow rate when the temperature of the fluid is greater than an upper threshold temperature for activating the passive bypass control valve;
   determining a fluid temperature supplied to the electric machine through the active coolant circuit based upon the third fluidic flow rate and the temperature drop of the fluid across the heat exchanger; and
   determining an effective fluid temperature at the electric machine based upon the temperature of the fluid in the sump and the temperature of the fluid supplied to the electric machine through the active coolant circuit.

2. The method of claim 1, wherein the third fluidic flow rate is zero when the temperature of the fluid is less than a minimum threshold temperature for activating the passive bypass control valve.

3. The method of claim 1, wherein the heat exchanger comprises an air-cooled heat exchanger, and wherein determining a temperature drop of the fluid across the heat exchanger in the active coolant circuit based upon the temperature of the fluid and the third fluidic flow rate through the active coolant circuit further comprises determining the temperature drop of the fluid across the heat exchanger based upon the temperature of the fluid, the third fluidic flow rate and an ambient air temperature.

4. The method of claim 1, wherein determining the effective fluid temperature based upon the temperature of the fluid in the sump and the temperature of the fluid supplied to the electric machine through the active coolant circuit comprises aggregating the first flow rate and the temperature of the fluid in the sump and aggregating the second flow rate and the temperature of the fluid supplied to the electric machine through the active coolant circuit.

* * * * *